(12) United States Patent
Weber

(10) Patent No.: X9092
(45) Date of Patent: Sep. 9, 1835

(54) CLAY, POTTERS', PURIFYING

(76) Inventor: Adam Weber

Adam Weber. Berks Co. Pennsylvania

Letters Patent

The Schedule referred to in these Letters Patent and making part of the same containing a description in the words of the said Adam Weber himself of his improvement in a machine for purifying Potters Clay To all to whom these presents shall come. Be it known that I Adam Weber of the Borough of Womelsdorf in the County of Berks & State of Pennsylvania have invented a new and very useful apparatus or machine for the purpose of purifying Potters Clay never before known by the use of which the clay becomes more pure and five sixth of the time saved — The following is a full and exact description of the construction & operation of the said apparatus or machine as invented by me. A is a side view of the bench. B is a cylinder which may be made of wood, Copper Brass or otherwise. C I name the presser. the upright E. has the central part of the wood cut out so as to permit the lever D. work up and down in it. the lever D works on a pin G. The presser C works on a pin I. on both sides of the lever D. H is a treader fastened on the lever D. by a wire extended up to it as seen in the drawing accompanying this specification. I is a sieve connected with the cylinder [fastened on the bench & has the cylinder] to rest on it. The machinery may be made of any size the same results will be attained if all the parts are made to correspond. The mode of operation is as follows. The potters clay being moistened is then put into the cylinder B it sinks and rests on the sieve attached to the bottom of the cylinder. the lever D is then raised which necessarily raises along with it the presser C. the presser C is then directed into the cylinder B. it sinks on the clay at the bottom. the workman then puts his foot into the treader H. and his hand on the lever D. towards the end. he then lets his weight on the lever D. which presses the clay through the sieve through the hole below the sieve in the bench and causes the clay to [come out] be purified at K. — When the sieve becomes dirty. filled with [illegible], pebbles, stones &c all that is necessary for the workman is to apply water to the bottom of the presser just before he directs it
into the cylinder for the purpose of pressing clay through the sieve. this done
when he raises the presser by means of the lever D it will bring along on its
bottom all impurities. It must here be remarked that there is a machine
extant somewhat similar to my invention above described. used for the pur
pose of making sausages and for no other. and could by no means be used
for the purpose for which I have invented my above described machine its
construction and operation is entirely different. In claiming the invention
of the above described machine. I do not intend to limit myself to the
precise modes and forms &c by me set forth but modify arrange the ma
chinery as I may deem proper whilst the same results are attained by
analagous means. and the same general principles &c are retained.

Exd. [illegible]

Witnesses
Geo. Klein [illegible]
A. B. Austin

Adam Weber (Drawing)

[630 wds]